United States Patent [19]

Tanaka et al.

[11] Patent Number: 4,698,464
[45] Date of Patent: Oct. 6, 1987

[54] CONTROL SWITCH FOR MOTOR DRIVEN REMOTE CONTROL MIRROR IN VEHICLE

[75] Inventors: Morimasa Tanaka, Atsugi; Shinichiro Ito, Nakatsugawa, both of Japan

[73] Assignee: Ichikoh Industries Limited, Tokyo, Japan

[21] Appl. No.: 813,682

[22] Filed: Dec. 26, 1985

[30] Foreign Application Priority Data

Dec. 25, 1984 [JP] Japan ................. 59-271941
Dec. 25, 1984 [JP] Japan ................. 59-271942
Jan. 14, 1985 [JP] Japan ................. 60-2320[U]

[51] Int. Cl.$^4$ .................. H01H 9/00; H01H 13/70
[52] U.S. Cl. ................... 200/5 R; 200/16 D; 200/18
[58] Field of Search ............... 200/1 R, 1 V, 4, 5 R, 200/5 A, 6 R, 6 A, 16 R, 17 R, 18

[56] References Cited

U.S. PATENT DOCUMENTS

| | | | |
|---|---|---|---|
| 4,330,694 | 5/1982 | Ogawa | 200/6 A |
| 4,428,649 | 1/1984 | Main et al. | 200/6 A X |
| 4,476,356 | 10/1984 | Nakayama et al. | 200/6 A |
| 4,499,342 | 2/1985 | Nakayama | 200/5 A X |
| 4,590,338 | 5/1986 | Suzuki | 200/18 X |

FOREIGN PATENT DOCUMENTS

5840451 9/1956 Japan.

*Primary Examiner*—J. R. Scott
*Attorney, Agent, or Firm*—Schwartz, Jeffery, Schwaab, Mack, Blumenthal & Evans

[57] ABSTRACT

A control switch for a motor driven remote control mirror device in a vehicle has a switching control circuit for connecting motors for driving a mirror to be tilted to a DC power source. The control circuit has first and second stationary contact to be connected with one terminals of the motors for tilting the mirror around horizontal and vertical axes, and a third stationary contact to be commonly connected to the other terminals of the motors, the contacts are selectively connected with the negative and positive polarities of a power source by bridge members disposed corresponding to the contacts. The bridge members ordinarily connect the contacts to the negative polarity of the power source, and connect, when elastically deformed, to the positive polarity. A push plate is elastically supported by the bridge members, has a leg for operating the bridge members on the back surface, and the relative bridge member is operated by pressing the direction indication unit of the push plate.

13 Claims, 19 Drawing Figures

CONTROL SWITCH FOR MOTOR DRIVEN REMOTE CONTROL MIRROR IN VEHICLE

BACKGROUND OF THE INVENTION (a) Field of the Invention

The present invention relates to a control switch for tilting the surface of a mirror in a motor driven remote control mirror device under a remote control to a position for obtaining an adequate rear visual field in a vehicle.

(b) Related Art Statement

In a motor driven remote control mirror device in a vehicle, the surfaces of a pair of mirrors arranged at the right and left sides of an automotive body are constructed to be rotatably revolved around horizontal and vertical axes at a pivot fixedly secured in a mirror housing as a center. The surfaces of the mirrors are tilted by being selectively driven under a remote control by two motors disposed in the mirror housing, and a regulator having a control switch for tilting the surface of the desired mirror toward the desired direction is disposed in a driver's cab.

A conventional regulator was disclosed, for example, in Japanese unexamined Utility Model Publication No. 58-40451. In this regulator, the mirror disposed at the left side is rotated around a horizontal or vertical axis by normally or reversely rotating respective motors. The mirror disposed at the right side is rotated similarly at the surface around a horizontal or vertical axis by respective motors. A control switch disposed in a driver's cab has a changeover switch for selecting any of mirrors disposed at the right and left sides, and a tilting direction selecting switch provided with a push plate having four direction indicators for indicating any tilting direction around a horizontal axis, i.e., upward or downward direction, or around a vertical axis, i.e., rightward or leftward direction of the selected mirror. Thus, the specific motor is normally or reversely rotated by a control circuit which includes these switches. The tilting direction selecting switch in the control circuit is a switching mechanism composed of a plurality of contacts. Since the changeover switch must have an independent toggle switch disposed in a control switch body, switch with a solenoid and have a plurality of diodes for preventing a current from reversely flowing in the control circuit, the entire regulator has a drawback from the points of power consumption and a voltage drop across the diodes and another disadvantage from the point of cost of uneconomy.

SUMMARY OF THE INVENTION

It is, therefore, an object of the present invention to provide a control switch having a control circuit including no elements such as diodes and solenoid and capable of tilting a specific mirror in a predetermined direction merely by a substantially mechanical switching mechanism.

Another object of the present invention is to provide a control switch having a reduced thickness in which a changeover switch for tilting any of two right and left side mirrors is formed on the same printed board as an operation switch for indicating the elevational and lateral directions of the mirrors.

Still another object of the present invention is to provide a control switch having a packing for preventing dust or water from entering on a printed board disposed with various contacts of changeover switch and operation switch.

The above and other objects of the invention will be apparent by those skilled in the art from a reading of the following detailed description of the disclosure found in the accompanying drawings and novelty thereof pointed out in the appended claims.

DETAILED DESCRIPTION OF THE PREFERRED EMBODIMENTS

Figure 1:
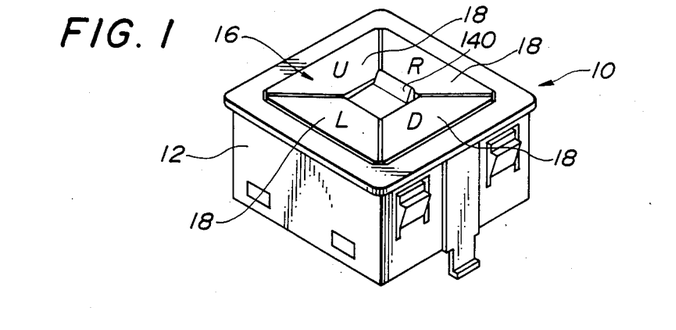
FIG. 1 is a perspective view showing the external appearance of a control switch according to the present invention.

In FIG. 1, the external appearance of a control switch 10 according to the present invention is entirely illustrated. Reference numeral 12 designates a casing of a switch body formed in a box shape. A printed board 14 mounted with a plurality of stationary contact groups of a control circuit for selectively rotating a plurality of motors $A_1$, $A_2$, $B_1$, $B_2$ as will be described is mounted on the bottom of the casing 12. An elevationally, i.e., upwardly and downwardly movable push plate 16 is disposed at the position opposed to the board 14 in the casing 12. Four tilting direction indicators 18 provided corresponding to four tilting directions, i.e., upward and downward, and rightward and leftward directions are formed on the outer surface of the push plate 16. The control switch 10 is disposed between the plurality of motors $A_1$, $A_2$, $B_1$, $B_2$, and a DC power source 40, i.e., a battery as a drive source for the motors, and constructed to tilt at the surface of the mirror in a predetermined direction when the direction indicator of arbitrary direction is pressed by a driver's finger. The control switch will be described in more detail.

Figure 2:
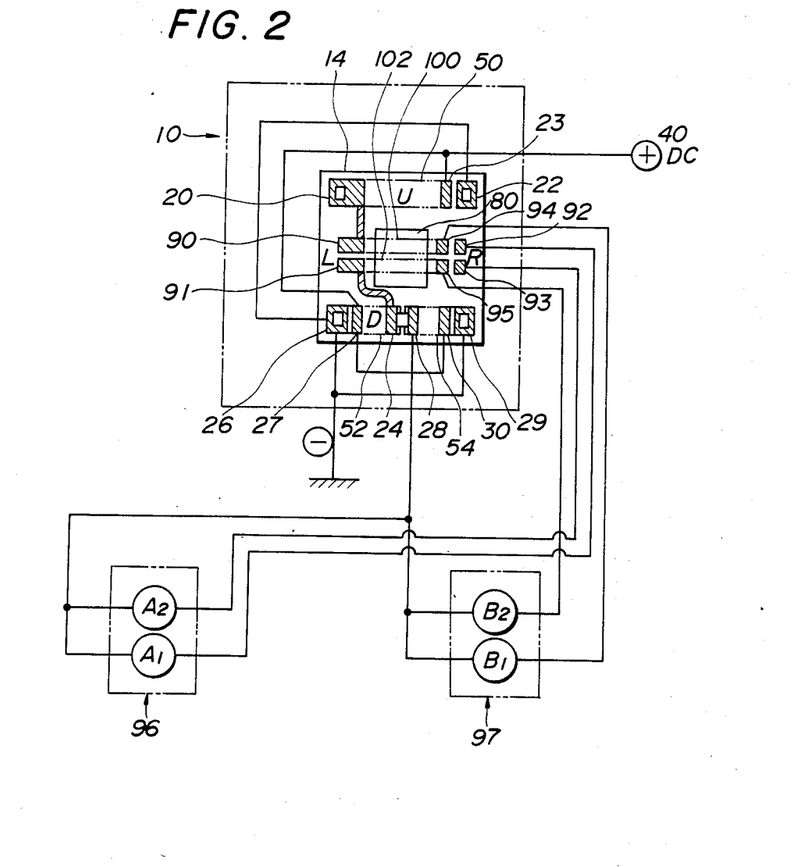
FIG. 2 is a circuit diagram showing an embodiment of a control circuit using a control switch according to the present invention.

FIG. 2 shows a control circuit of the control switch 10 of the invention. The printed board 14 is formed substantially in a rectangular shape, and a first stationary contact 20 and first stationary contact pair 22, 23 corresponding to the contact 20 are disposed at the positions along one side of the board on the board. The contact 22 of the first contact pair is always connected to the negative polarity of the DC power source 40, and the contact 23 is connected similarly to the positive polarity. A second stationary contact 24 and second stationary contact pair 26, 27 corresponding to the contact 24 as well as a third stationary contact 28 and third stationary contact pair 29, 30 corresponding to the contact 28 are respectively arranged at positions along one side underneath the board 14. The contacts 26, 27 of the second contact pair are respectively connected to the negative and positive polarities of the power source 40. Similarly, the contacts 29, 30 of the third contact pair are respectively connected to the negative and positive polarities of the power source 40.

Figure 3:
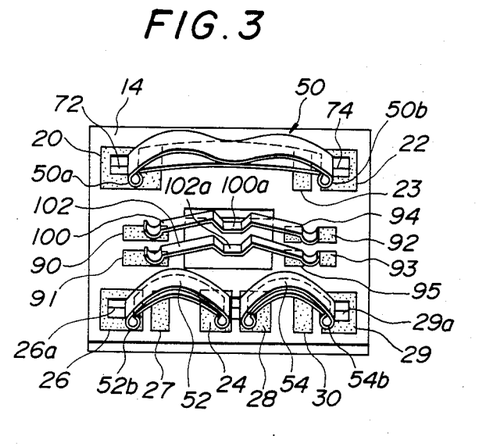
FIG. 3 is a schematic enlarged perspective view showing a construction of a plurality of contacts of a control switch.
Figure 4:
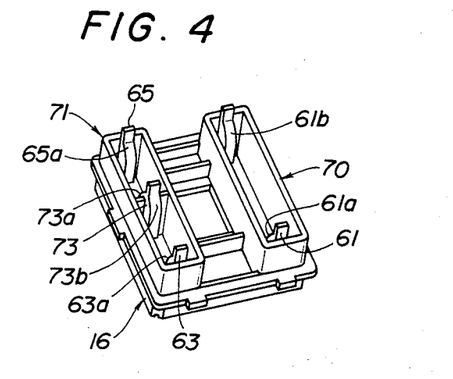
FIG. 4 is a perspective view showing operating members formed on the back surface of a push plate.
Figure 6:
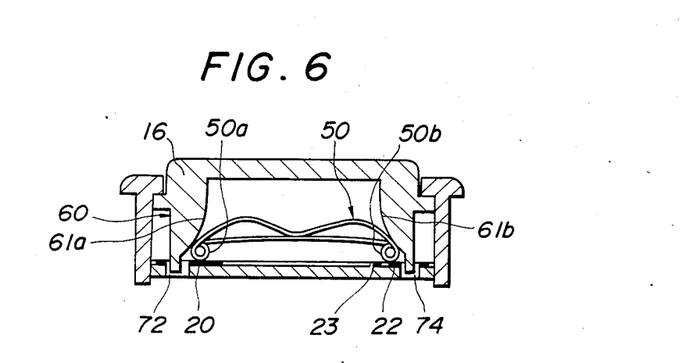
FIG. 6 is a sectional view showing the positional relationship between the first operating member and a first bridge member.

The stationary contacts and the corresponding contact pairs respectively construct stationary contact groups. As shown in FIG. 3, bridge (50, 52, 54) members formed of an elastic material having electric conductivity are respectively disposed corresponding to the stationary contact groups. The first bridge member 50 bridges between the first contact 20 and the first contact pair 22, 23, and slidable contacts 50a, 50b are provided at both ends of the bridge member. One contact 50a is always slid in contact with the first contact 20, and the other contact 50b is always contacted with one contact 22 of the first contact pair 22, 23, and disposed to contact with the other contact 23 when the first bridge member 50 is elastically deformed (FIG. 6). Similarly, second and third bridge members 52, 54 are disposed between the second contact 24 and the second contact pair 26, 27, and between the third contact 28 and the third stationary pair 29, 30, and slidable contacts 52a, 52b and 54a, 54b are respectively provided at both ends of the bridge members 52 and 59. The bridge members 50, 52 and 54 preferably have auxiliary leaf springs inside to supplement the elasticity. Further, the second and third bridge members 52 and 54 are approximately one-half the length of the bridge member 50, are disposed substantially on the same rectilinear line, and arranged to ordinarily form a substantially square shape with the one contact 50a of the first bridge member 50 contacted with the first contact 20, the other contact 50b of the first bridge member 50 at the position contacted with the contact 22 of the first contact pair 22, 23, one contact 52b of the second bridge member 52 at the position contacted with the contact 26 of the second contact pair 26, 27, and one contact 54b of the third bridge member 54 at the position contacted with the contact 29 of the third contact pair 29, 30. Operating members 60, 62 and 64 for elastically deforming these bridge members 50, 52 and 54, respectively are provided integrally on the back surface of the push plate 16. As shown in FIG. 4, a box-shaped member 70 formed to extend in a slender shape in a direction along one side corresponding to the first bridge member 50 is disposed at the opposite side of the push plate 16 to the surface of the push plate 16 arranged with the tilting direction indicator 18. A first operating member 60 which is composed of a pair of legs 61 and 61 respectively having tapered surfaces 61a and 61b at both end walls is disposed inside the member 70. The legs 61 and 61 are disposed at their ends near an opening 72 formed partly through the first contact 20 and an opening 74 formed partly through one contact 22 of the first contact pair 22, 24. The surfaces 61a and 61b are partly contacted with the outer peripheral surfaces near the ends of the first bridge member 50.

Figure 7:
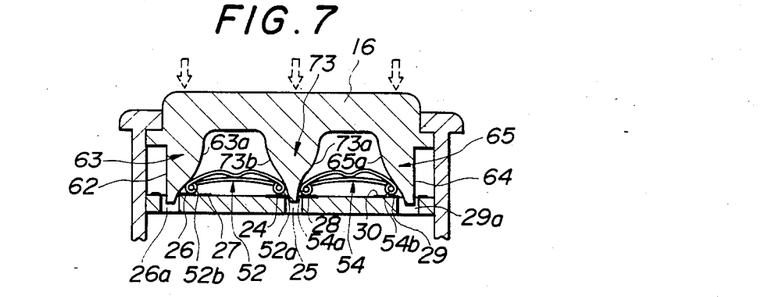
FIG. 7 is a sectional view showing the positional relationship between the second and third operating members and second and third bridge members.

On the other hand, another box-shaped member 71 is formed to extend in a slender shape in a direction along one side opposed to the one side of the opening of the push plate 16, i.e., corresponding to the second and third bridge members 52 and 54. A partition wall 73 is formed substantially at the center of the member 71, and two compartments divided by the wall 73 form spaces for containing the second and third bridge members 52 and 54, respectively. A leg 63 having a tapered surface 63a is formed on one end wall inside the member 71, and a tapered surface 73b is formed on one side of the wall 73. A leg 65 having a tapered surface 65a is formed on the other end wall inside the member 71, and a tapered surface 73a is formed on the other end of the wall 73. A leg is formed of the tapered surfaces 73b and 73a, and the wall 73. A second operating member 62 is formed of the leg 63, and the tapered surface 73b of the wall 73, and a third operating member 64 is formed of the leg 65 and the tapered surface 73a of the wall 73. The leg 63 is disposed at the end near an opening 26a formed through part of the contact 26 of the second contact pair 26, 27 as shown in FIG. 7, the leg 65 is formed at the end near the opening 29a formed through part of the contact 29 of the third contact pair 29, 30, and the wall 73 is further disposed near the opening 25 formed between the second contact 24 adjacent thereto and the third contact 28. The tapered surface 63a is contacted with the outer periphery near the one end of the second bridge member 52, the tapered surface 73b is contacted with the outer periphery near the other end of the second bridge member 52, the tapered surface 73a is contacted with the outer periphery near one end of the second bridge member 54, and the tapered surface 65a is contacted with the outer periphery near the other end of the third bridge member 56, and the legs are lifted. The above-mentioned first, second and third operating members 60, 62 and 64 are formed integrally with the push plate 16, the tapered surfaces 61a, 61b, 63a, 73b and 73a, 65a are respectively contacted with the outer periphery near the both ends of the first, second and third bridge members 50, 52 and 54, and the surface of the push plate 16 arranged with the four tilting direction indicators 18 is held substantially at the position parallel with the board 14. This state is held by engaging the projection projected on the side wall of the push plate 16 with the inner wall of the opening end of the casing 12. The indicators 18 are formed along the four sides of the push plate 16, and disposed corresponding to the tilting direction of the tiltable mirror. The tilting directions of the mirror around the horizontal axis, i.e., the upward and downward directions are respectively indicated by U and D, and the tilting directions around the vertical axis, i.e., the rightward and leftward directions are respectively indicated by R and L.

A U indication unit of the tilting direction indicator 18 is provided at the position corresponding to the first bridge member 50, a D indication unit is provided at the position corresponding to the second and third bridge members 52, 54 disposed on a rectilinear line, a L indication unit is provided at the position corresponding to a rectilinear line for coupling one end of the first bridge member 50 with that of the second bridge member 52, and a R indication unit is provided at the position corresponding to a rectilinear line for coupling the other end of the first bridge member 50 with that of the third bridge member 54. These corresponding relationships are respectively designated by reference characters U, D, L and R in FIG. 2.

The connected state between the stationary contacts of the case that the indicators 18 of the push plate 16 of the control switch of the present invention will be described in more detail.

Figure 8:
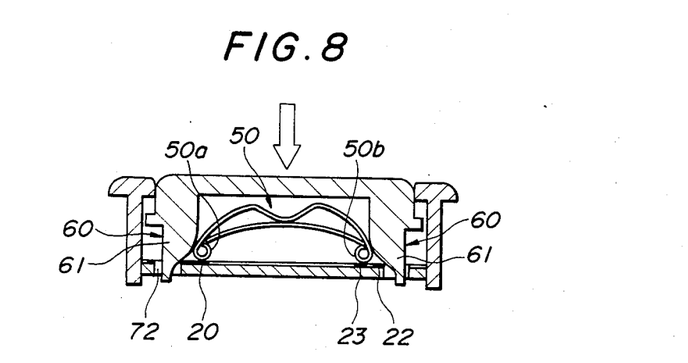
FIGS. 8 and 9 are explanatory views for describing the operations of the first operating and bridge members.

When the U indication unit is first pressed, the push plate 16 itself moves at one side formed with the U indication unit toward the direction of the printed board slightly from the horizontal state. This state is shown in FIG. 8. An arrow with a solid line designates the pressing direction. At this time, the legs 61, 61 of the first operating member 60 are together introduced at the ends into the openings 72, 74 formed at the printed board 14, and the tapered surfaces 61a, 61b elastically deform the first bridge member 50 while contacting the outer periphery of the first bridge member 50. The contact 50a disposed at one end of the first bridge member 50 is slid on the first contact 20 in the state contacted with the first contact 20, and the contact 50b disposed at the other end is slid to contact with the contact 23 of the first contact pair 22, 23. Thus, the first contact 20 is electrically connected to the positive polarity of the DC power source 40. When a driver separates his finger from the push plate 16, the first member 50 is returned to the original state by the returning force of the bridge member itself, and the first contact 20 is electrically connected with the negative polarity of the power source 40.

Then, when the D indication unit is pressed, one side of the plate 16 formed with the D indication unit slightly moves toward the printed board 14 from the horizontal state. The state before moving is shown in FIG. 7. In FIG. 7, central one of three arrows with broken lines corresponds to the pressing direction. At this time, the legs 63, 73 and 65 of the second and third operating members 62 and 64 are all introduced at the ends into the openings 26a, 25 and 29a formed at the printed board 14, the tapered surfaces 63a, 73b remain contacted with the outer periphery of the second bridge member 52, the second bridge member 52 is elastically deformed, the tapered surfaces 73a, 65a remain contacted with the outer periphery of the third bridge member 54, and the third member bridge 54 is elastically deformed. The contact 52a disposed at one end of the second bridge member 52 is slid in the state contacted with the second contact 24, and the contact 52b slid to contact with the contact 27 of the second contact pair 26, 27. The third bridge member 54 is similarly slid in the state that the contact 54a is contacted with the third contact 28, and the contact 54b moves to contact the contact 30 of the third contact pair 29, 30. Thus, the contacts 24, 28 are substantially simultaneously electrically contacted to the positive polarity of the power source 40. When the driver separates his finger from the plate 16, the second and third bridge members 52, 54 are substantially simultaneously returned by the returning force to the original state, and the second and third contacts 24, 28 are electrically connected to the negative polarity of the power source 40.

Figure 9:
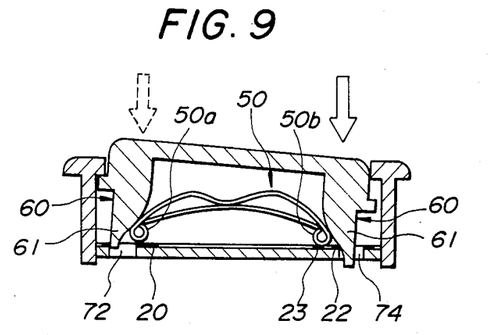

Then, when the L indication unit is pressed, the leg 61 disposed at the first contact 20 side is introduced at the end into the opening 72 and the leg 63 of the second contact pair side is introduced at the end into the opening 26a, with the result that the tapered surface 61a of the first operating member 60 elastically deforms the first bridge member 50, the contact 50a of the first bridge member 50 slides in the same manner as when the U indication unit is pressed, the tapered surface 63a of the second member 62 elastically deforms the second bridge member 52, and the contact 52b of the second bridge member 52 slides to contact with the contact 27 of the second contact pair 26, 27. Thus, the first contact 20 holds the state electrically connected to the negative polarity of the power source 40, and the second contact 24 is electrically connected with the positive polarity. This state corresponds to when the plate 16 is pressed in the direction of the arrow with the broken line at the left side in FIG. 7, and to when the plate 16 is pressed in the direction of the arrow with the broken line at the left side in FIG. 9.

Then, when the R indication unit is pressed, the leg 61 disposed at the first contact pair side is introduced at the end into the opening 74, and the leg 65 of the third contact side is simultaneously introduced at the end into the opening 29a, with the result to elastically deform the first bridge member 50, the contact 50b of the first bridge member 50 slides to contact with the contact 23 of the first contact pair 22, 23, the tapered surface 65a of the third member 64 elastically deforms the third bridge member 54, and the contact 54b of the third bridge member 54 is slide to contact with the contact 30 of the third contact pair 29, 30. Thus, the first and third contacts 20, 28 are substantially simultaneously electrically connected with the positive polarity of the power source 40. This state corresponds to the case that the plate 16 is pressed in the direction of the arrow with the broken line at the right side in FIG. 7 and pressed in the direction of the arrow with the solid line at the right side in FIG. 9.

A changeover switch is described below with reference to FIGS. 2 and 3. The opening 80 of a square shape is formed substantially at the center of the printed board 14, and three sets of stationary contact pairs 90, 91; 92, 93; 94, 95 are respectively disposed at the both side positions of the opening 80. The fourth contact pair 90, 91 are formed in a slender rectangular shape, and disposed substantially in parallel with each other. The contact 90 is electrically connected with the first contact 20, and the contact 91 is electrically connected with the second contact 24.

On the other hand, fifth and sixth contact pairs 92, 93 and 94, 95 are disposed at the opposite positions to the fourth contact pair 90, 91 at both sides of the opening 80, formed in a rectangular shape of approx. ½ the size of the contact pair 90, 91, and spaced from each other.

The contacts 90, 94, 92 are disposed on one rectilinear line, and the contacts 91, 95, 94 are disposed on the rectilinear line parallel with the rectilinear line of the opening.

The contacts 92, 93 are electrically connected with terminals of the motors $A_1$, $A_2$ for tilting the mirror 96 mounted on the automotive body at the left side of the vehicle, the contact 94, 95 are electrically connected with one terminal of the motors $B_1$, $B_2$ for tilting the mirror 97 mounted on the automotive body at the right side of the vehicle. Further, the other terminals of the motors $A_1$, $A_2$ and $B_1$, $B_2$ are commonly electrically connected with the third contact 28.

Figure 10:
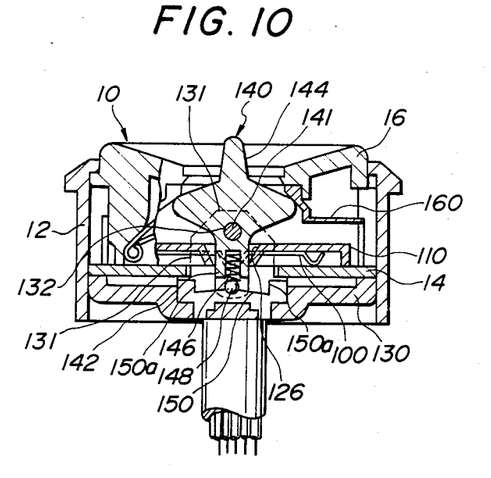
FIG. 10 is a longitudinal sectional view partly in fragment of the control switch according to the present invention.
Figure 11:
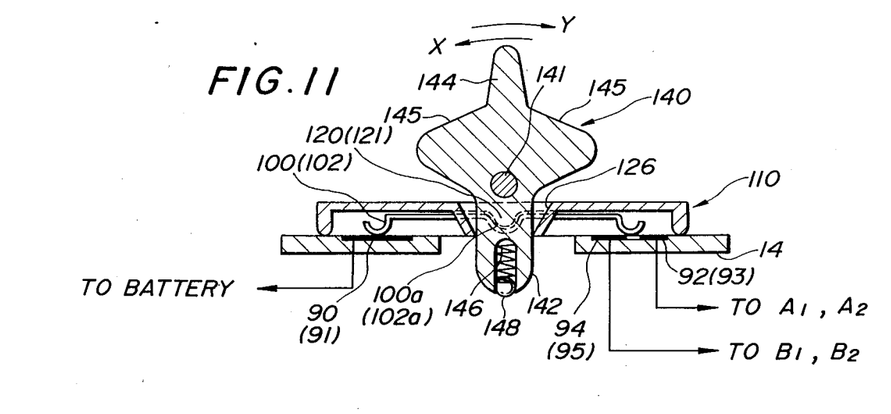
FIG. 11 is an explanatory view for describing the operation of a selection switch.

The contacts 90, 91 are selectively electrically connected with the fifth and sixth contact pairs 92, 93 and 94, 95 through fourth and fifth bridge members 100 and 102. The fourth and fifth bridge members 100, 102 are formed of an electrically conductive elastic material, and simultaneously slide in the state that the both ends are contacted with the contacts of the fifth and sixth stationary contact pairs. More particularly, the fourth and fifth bridge members 100, 102 are held at a slider 110 in the state disposed substantially in parallel with each other as shown in FIG. 3. Two slender partitions (one of which is shown in FIGS. 10 and 11) for individually containing the bridge members 100, 102 disposed in parallel are formed at the slider 110. Projections 120, 121 are so formed as to be engaged with recesses 100a and 102a formed at the centers of the fourth and fifth bridge members 110, 102 at the center of the partitions, respectively. A rectangular opening 124 is formed substantially at the center of the slider 110, and two tapered walls 126 inclined from the opposed opening ends downwardly are formed as shown enlarged in FIG. 10.

On the other hand, the printed board 14 is supported by a holder 130, and a pair of vertical ribs 131 are aligned in parallel at the center of the holder 130. The ribs 131 are inserted into the opening 80 formed at the center of the board 14, and projected to the side formed with the stationary contact groups of the board 14. A distance between the pair of ribs 131 is selected slightly larger than the width of the slider 110, and the slider 110 is disposed therebetween. Reference numeral 140 designates a selection switch body for moving the slider 110, which is rotatably mounted on the pair of ribs 131. Small projections 141 are extended toward the ribs 131 at both sides of the switch body 140, openings 132 for receiving the projections 141 are formed at the ribs 131, and the switch body 140 is formed to rotate in the direction for substantially moving the slider 110 at the opening 132 of the rib 131 as a center. The switch body 140 is composed of a leg 142 extending in the direction of the holder 130 through the opening 124 formed at the slider 110 and the opening 80 of the printed board 14, and an operating knob 144 projected outside of the casing 12 through the rectangular opening 17 formed substantially at the center of the plate 16, and the leg 142 is rotated in the direction of an arrow y or x by moving the knob 144 in the direction of the arrow x or y as shown in FIG. 11. A small compressed coiled spring 146 and a small ball 148 are arranged in the leg 142, and the ball 148 is partly held in the state slightly projected from the end of the leg 142 toward the outside. A groove corresponding to the moving direction of the slider 110 is formed at the end of the leg 142, and engaged, as shown in FIG. 10, with the central portion of a guide passage 150 of the holder 130. The state shown in FIGS. 10 and 11 is a neutral position, and the ball 148 is held at its position in the state slightly pressed into the leg 142 against the elastic tension of the coiled spring 146.

The fourth and fifth bridge members 100 and 102 are contacted at their one ends with the contacts 90 and 91, respectively at the neutral position, but disposed at the other ends between the fifth contact pair 92, 93 and the sixth contact pair 94, 95 on the printed board.

In FIG. 11, when the knob 144 is moved in the direction of the arrow x, the switch body 140 is rotated counterclockwise. At this time, the leg 142 is contacted with the tapered wall 126 of the opening 124 of the slider 110 to move the slider 110 rightward. Since the fourth and fifth bridge members 100 and 102 are engaged with the slider 110, the members 100, 102 slide rightward together with the slider 110, and the fourth contact pair 90, 91 are connected with the fifth contact pair 92, 93, respectively. The leg 142 is rotated at the groove of the lower end counterclockwise, engaged with the rising portion 150a of the guide passage 150 to prevent the switch body 140 from rotating. Similarly, when the knob 144 is moved in the direction of the arrow y, the slider 110 moves leftward, and the fourth contact pair 90, 91 are respectively connected with the sixth contact pair 94, 95.

Figure 5:
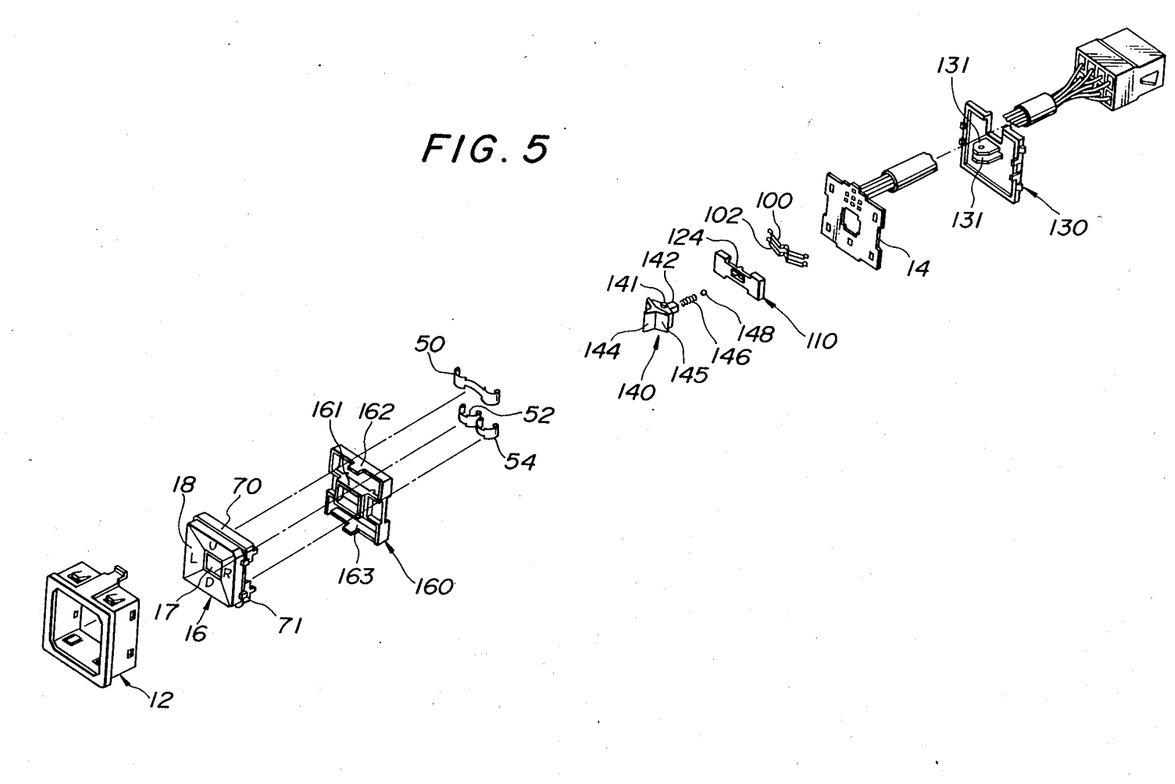
FIG. 5 is a schematic exploded perspective view showing the entire control switch.

In the control switch according to the present invention, a member 160 for preventing a foreign material such as dust or water from entering is disposed on the printed board 14, on which the contact group are formed and the plurality of bridge members are arranged, as shown in FIGS. 5 and 10. Since the foreign material is mainly introduced externally into the casing 12 through the opening 17 provided at the center of the push plate 16 for exposing the operating knob 144, the packing 160 is disposed between the plate 16 and the printed board 14. More specifically, the packing 160 is formed integrally of a portion 161 which is closely contacted with the periphery of the opening 17 on the back surface of the plate 16 and with the tapered portion 145 of the switch body 140, and portions 162 and 163 which is closely contacted with the outer periphery of the member 70 formed on the back surface of the plate 16, and formed of a material such as, for example, a soft and elastic material like rubber. Such a packing 160 is necessary to be formed in the state so as not to disturb the movements of the operating knob 144 when the knob 144 is rotated. Further, it is also necessary to provide a slight gap between the packing 160 and the inner wall of the casing 12 so as not to disturb the movement of the plate 16 when the plate 16 is pressed to move. Such a packing 160 can prevent an improper conduction between the stationary contacts and the slidable contacts disposed at both ends of the bridge members due to the dust introduced into the casing and adhered to the vicinity of the stationary contacts and improve the reliability of switching the contacts.

Then, the operation of selectively tilting the two mirrors 96, 97 mounted on the body of the vehicle under the remote control by the control switch according to the present invention will be described in detail.

When the mirror 96 mounted at the left side of the body of the vehicle is first tilted, the knob 144 for operating the selection switch is pressed in the direction of the arrow x as shown in FIG. 11. Thus, the contacts 90, 91 are respectively contacted with the contacts 92, 93. Since the contacts 90, 91 are respectively contacted with the first and second contacts 20, 24, the one terminals of the motors $A_1$, $A_2$ are connected to the negative polarity of the power source 40. Since the third contact 28 is always contacted with the common terminal of the motors $A_1$, $A_2$, $B_1$, $B_2$, the remaining terminals of the motors $A_1$, $A_2$ are connected with the negative polarity of the power source 40. The all terminals of the motors $A_1$, $A_2$ are connected with the negative polarity of the power source 40, i.e., held with the ground potential in this state.

Then, when any one of the U, D, L and R indication units of the indicators 18 on the surface of the plate 16 is pressed by a finger, any of the motors $A_1$, $A_2$ can be rotated normally or reversely.

Figure 12:
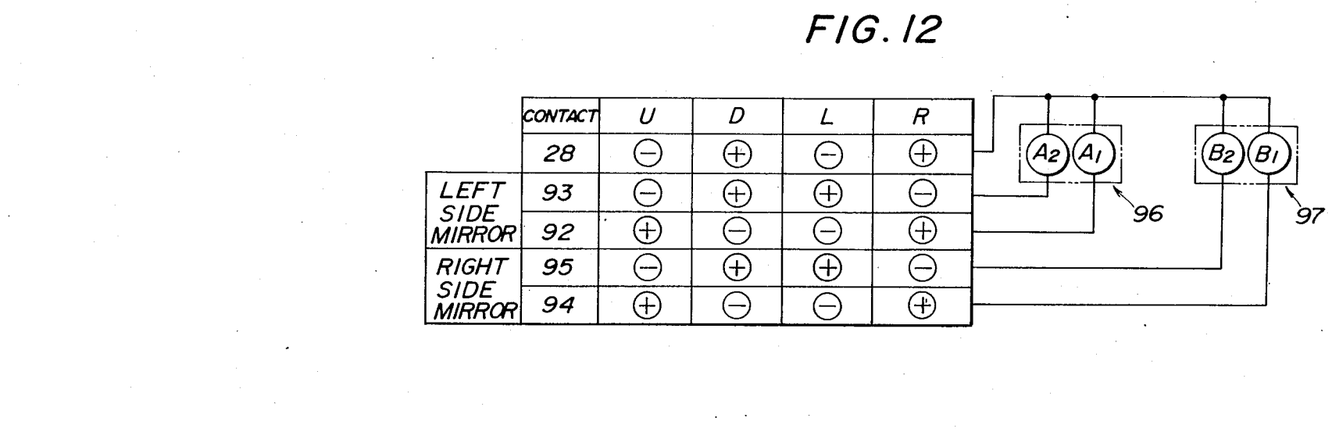
FIG. 12 is an explanatory view of the operation of a control circuit using a control switch according to the present invention.

When the U indication unit is, for example, pressed, the corresponding first operating member 60 acts on the first bridge member 50 to elastically deform it, and the first contact 20 is connected with the contact 23 connected with the positive polarity of the power source 40. Therefore, as shown in FIG. 12, the contact 90 connected with one terminal of the motor $A_1$ is held at the positive potential, the contact 91 connected with one terminal of the motor $A_1$ is held at the negative potential, and the third contact 28 connected commonly with the other terminals of the motors $A_1$, $A_2$ are held at the negative potential. As a result, a current flowed from the contact 90 to the contact 28 flows to the motor $A_1$ to normally rotate the motor $A_1$, and the mirror 96 is tilted upward. Since the two terminals of the motor $A_2$ are held at the negative potential, the motor $A_2$ does not operate.

When the D indication unit is, then, pressed, the corresponding second and third operating members 62, 64 act on the second and third bridge members 52, 54 to elastically deform the second and third bridge members 52, 54. At this time, the second and third contacts 24, 28 are together connected with the contacts 27, 30 connected with the positive polarity of the power source 40. Therefore, since the contact 92 connected with one terminal of the motor $A_1$ is held at the negative potential, the contact 93 connected with one terminal of the motor $A_2$ is held at the positive potential and the contact 28 is also held at the positive potential, a current flowed from the third contact 28 to the contact 92 is consequently flowed to the motor $A_1$ to reversely rotate the motor $A_1$, thereby tilting the mirror 96 downward. Since the two terminals of the motor $A_2$ are held at the same positive potential, the motor $A_2$ does not operate.

When the L indication unit is, then, pressed, the corresponding second operating member 62 is merely acted to elastically deform the second bridge member 52, and the second contact 24 is held at the positive potential. At this time, the first bridge member 50 is elastically deformed, but only the contact 50a is slid, but the contact 50b is not slid. Thus, the contact 92 remains at the negative potential.

Therefore, since the contact 92 is held at the negative potential, the contact 93 is held at the positive potential and the third contact 28 is held at the negative potential, a current flowed from the contact 93 to the third contact 28 is consequently flowed to the motor $A_2$ to normally rotate the motor $A_2$, thereby tilting the mirror 96 leftward. Since the two terminals of the motor $A_1$ are held at the same negative potential, the motor $A_1$ does not operate.

When the R indication unit is similarly pressed, the first and third operating members 60, 64 respectively elastically deform the first and third bridge members 50, 54. At this time, since the contact 92 is held at the positive potential, the contact 93 is held at the negative potential and the third contact 28 is held at the positive potential, a current flowed from the third contact 28 to the contact 93 is consequently flowed to the motor $A_2$ to reversely rotate the motor $A_2$, thereby tilting the mirror 96 rightward. Since the two terminals of the motor $A_1$ is held at the positive potential, the motor $A_1$ does not operate.

When the mirror 97 mounted at the right side of the body of the vehicle is tilted, the knob 144 for operating the selection switch is pressed in the direction of the arrow y as shown in FIG. 11 to connect the contacts 90, 91 with the contacts 94, 95, respectively, and the above-mentioned operation may be similarly performed.

The control switch of the present invention can tilt the predetermined mirror while pressing any one of the four indication units U, D, L and R of the push plate 16, but when the knob 144 is held at the neutral position as shown in FIG. 11, the motor does not operate even if the indicator 18 is erroneously contacted.

Figure 13:
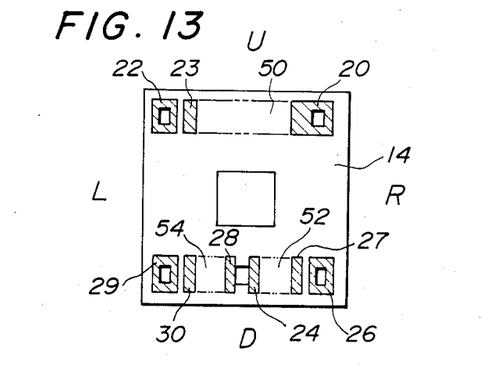
FIGS. 13 through 19 are schematic explanatory views showing other arrays of a plurality of stationary contacts and the bridge members of the control switch according to the invention.
Figure 14:
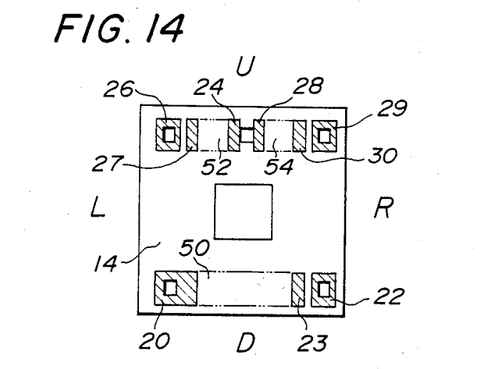
Figure 15:
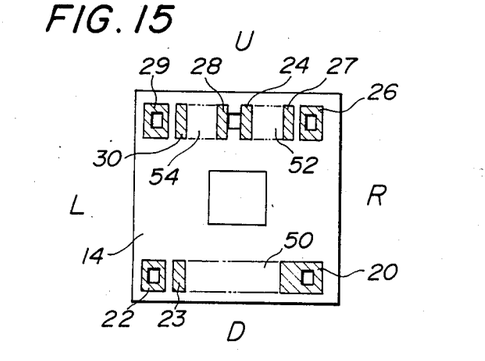

In the embodiments described above, the first contact 20 to be connected to one terminals of the motors $A_1$, $B_2$ for tilting the mirrors 96, 97 around a horizontal axis and the first contact pair 22, 23 disposed corresponding to the contact 20 are arranged corresponding to the U indication unit of the plate 16, the second contact 24 to be selectively connected with one terminals of the motor $A_2$, $B_2$ for tilting the mirrors 96, 97 around a vertical axis and the second contact pair 26, 27 disposed corresponding to the contact 24, the third contact 28 to be connected to the remaining terminals of the motors $A_1$, $A_2$, $B_1$, $B_2$ and the third contact pair 29, 30 disposed corresponding to the contact 28 are arranged corresponding to the D indication unit of the plate 16. However, they may be arranged as shown in FIGS. 13 to 15. In FIGS. 13 to 15, fourth to sixth stationary contact pairs 90, 91; 92, 93; and 94, 95 of a changeover switch are omitted.

Figure 16:
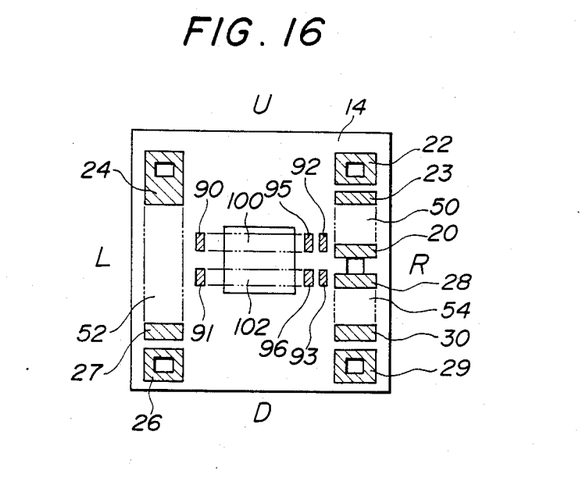
Figure 17:
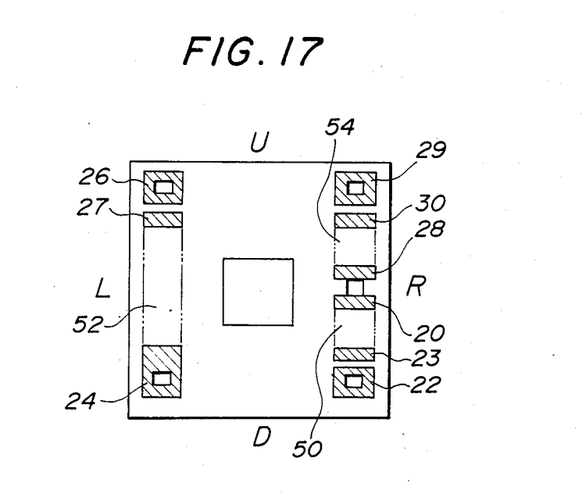
Figure 18:
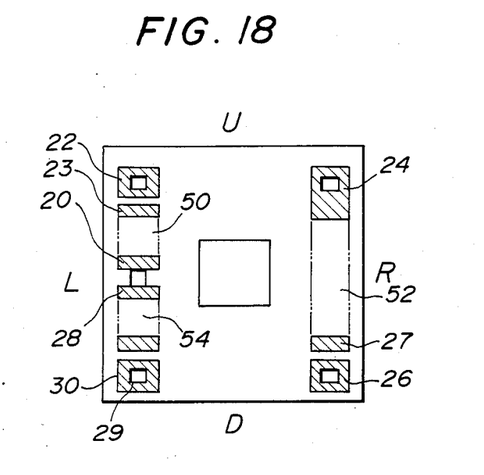
Figure 19:
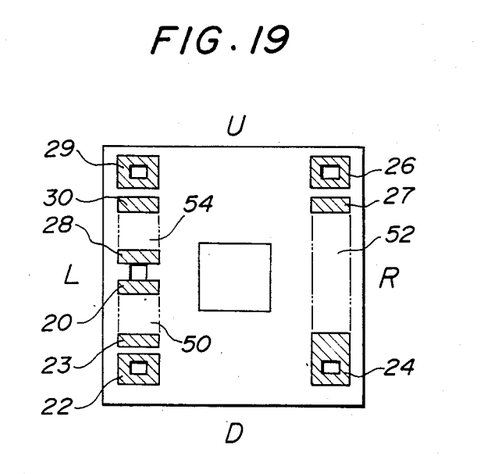

A stationary contact array shown in FIG. 16 provides another possibility. In this embodiment, a first stationary contact 20 and first stationary contact pair 22, 23 corresponding to the contact 20, and a third stationary contact 28 and third stationary contact pair 29, 30 corresponding to the contact 28 are arranged along one side corresponding to the R indication unit, and a second stationary contact 24 and second stationary contact pair 26, 27 corresponding to the contact 24 are arranged along the other one side corresponding to the L indication unit. First and third bridge members 50, 54 are formed in approx. ½ size of the second bridge member 52, and these bridge members are disposed to substantially perpendicularly cross the direction for sliding the fourth and fifth bridge members 100, 102 of a changeover switch. It will be further understood that the array shown in FIGS. 17 to 19 may be possible. In FIGS. 17 to 19, elements of the changeover switch are omitted.

Since the control switch of the present invention can form a control circuit for controlling the elevational and lateral tilts of the mirrors only by a purely mechanical contact structure, it is understood that elements such as a plurality of solenoids and diodes are not required. The embodiments of the present invention described in detail as above are for clarifying the technical contents of the invention, and the present invention is not limited to the particular embodiments. Various other changes and modifications may be made within the spirit and scope of the present invention.

What is claimed is:

1. A control switch for tilting one or more mirrors rotatably supported in a vehicle around a horizontal or vertical axis under a remote control through two motors driven by a DC power source comprising:

first and second stationary contacts to be respectively connected to first terminals of said first and second motors for tilting the mirrors around a horizontal or vertical axis, first and second stationary contact pairs respectively provided relative to said first and second stationary contacts and having two stationary contacts to be respectively connected to positive or negative polarity of said power source, a third stationary contact to be commonly connected to the second terminals of said first and second motors, a third stationary contact pair provided relative to said third stationary contact and having two stationary contacts to be respectively connected to the positive or negative polarity of said power source, first, second and third bridge members formed of a conductive elastic material and respectively disposed to electrically connect between said first, second and third stationary contacts and said first, second and third stationary contact pairs provided relative to said first, second and third stationary contacts so that a first end of each of said bridge members is always in contact, respectively, with said first, second and third stationary contacts and a second end of each of said bridge members is in contact with the stationary contacts of any of said first, second and third stationary contact pairs, first, second and third operating members arranged to respectively operate said first, second and third bridge members to connect said first, second and third stationary contacts to a first contact of said first, second and third stationary contact pairs to be connected with the negative polarity of said power source and to respectively operate said first, second and third bridge members so as to elastically deform said first, second and third bridge members to connect said first, second and third stationary contacts to a second contact of said first, second and third stationary contact pairs to be connected with the positive polarity of said power source, and a plate member integrally formed to said first, second and third operating members, to selectively operate said first, second and third operating members when said plate member is depressed.

2. The control switch as claimed in claim 1, further comprising: a changeover switch for driving another mirror through third and fourth motors by the same DC power source around a horizontal or vertical axis, said changeover switch constructed to selectively electrically connect said first and second stationary contacts to the first terminals of said first and second motors and the first terminals of said third and fourth motors.

3. The control switch as claimed in claim 1, wherein said first to third stationary contacts and first to third stationary contact pairs are formed on a printed board, said first stationary contact and said first stationary contact pair corresponding to said first stationary contact, and said third stationary contact and said third stationary contact pair corresponding to said third stationary contact are disposed in space on a first rectilinear line, and said second stationary contact and second stationary contact pair corresponding to said second stationary contact are spaced from said first rectilinear line and disposed in space on a second rectilinear line in parallel with said first rectilinear line, and said first and third stationary contacts are disposed adjacent to each other.

4. The control switch as claimed in claim 1 wherein said plate member has first and second indication units for indicating the rotating direction of said mirrors around a horizontal axis and third and fourth indication units for indicating the rotating direction of said mirrors around a vertical axis.

5. The control switch as claimed in claim 1, wherein said first to third stationary contacts and said first to third stationary contact pairs are formed on a printed board, said first stationary contact and said first stationary contact pair corresponding to said first stationary contact are disposed in space on a first rectilinear line, said second stationary contact and second stationary contact pair corresponding to said second stationary contact, and said third stationary contact and said third stationary contact pairs corresponding to said third stationary contact are spaced from said first rectilinear line and disposed in space on a second rectilinear line in parallel with said first rectilinear line, and said second and third stationary contacts are disposed adjacent to each other.

6. The control switch as claimed in claim 5, further comprising a casing detachably engaged with the peripheral edge of said printed board and having an upper opening above the surface of said printed board, said plate member being formed in the state of an operating plate disposed movably in said casing.

7. The control switch as claimed in claim 6, wherein said first to third bridge members are formed at least at part thereof in an arcuate shape, and elastically deformed in the state that the ends of said first to third bridge members are contacted with the surface of said printed board by the operations of said first to third operating members.

8. The control switch as claimed in claim 7, wherein said first to third operating members respectively have at least one operating tapered surface contacted with part of the arcuate peripheral surfaces of said first to third bridge members, and said first to third bridge members are respectively elastically deformed by the movements of said operating surfaces toward said printed board.

9. The control switch as claimed in claim 7, wherein the longitudinal size of said second and third bridge members are substantially ½ of the longitudinal size of said first bridge member, and before elastically deforming, the both ends of said first bridge, one end of said second bridge member, and one end of said third bridge member are arranged to substantially form a square shape.

10. The control switch as claimed in claim 6, further comprising a changeover switch for driving other mirror rotatably supported in the vehicle by the same DC power source through third and fourth motors for tilting the mirror around a horizontal or vertical axis, said changeover switch having fourth stationary contact pair respectively connected with said first and second stationary contacts, fifth stationary contact pair to be respectively connected to the first terminals of said first and second motors, sixth stationary contact pair to be respectively connected with the first terminals of said third and fourth motors, conductive fourth and fifth bridge members slidably arranged to respectively selectively connect said fourth contact pair to said fifth or sixth contact pair, and slide means for simultaneously sliding said fourth and fifth bridge members, said fourth and sixth stationary contact pairs being formed on said printed board, and said third stationary contact pair being commonly connected with the other terminals of said third and fourth motors.

11. The control switch as claimed in claim 10, wherein said slide means has a slider for holding and sliding said fourth and fifth bridge members to contact at the both ends of said fourth and fifth bridge members with said printed board, and an operating knob for applying a sliding force to said slider, said knob being exposed at one end thereof with the outside from an opening formed at said operating plate.

12. The control switch as claimed in claim 11, wherein packings formed integrally of a soft material are respectively interposed between the side of said operating plate and the inner wall of said casing, and between the periphery of the opening of said operating plate and said operating knob.

13. The control switch as claimed in claim 6 wherein said casing has first and second indication units for indicating the rotating direction of said mirrors around a horizontal axis and third and fourth indication units for indicating the rotating direction of said mirrors around a vertical axis.

* * * * *